(12) United States Patent
Yen

(10) Patent No.: US 11,419,183 B2
(45) Date of Patent: Aug. 16, 2022

(54) OUTER FRAME, TERMINAL HOUSING AND TERMINAL

(71) Applicant: BEIJING XIAOMI MOBILE SOFTWARE CO., LTD., Beijing (CN)

(72) Inventor: Chiafu Yen, Beijing (CN)

(73) Assignee: BENING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 16/696,305

(22) Filed: Nov. 26, 2019

(65) Prior Publication Data
US 2020/0252994 A1    Aug. 6, 2020

(30) Foreign Application Priority Data

Jan. 31, 2019  (CN) .......................... 201910100711.9

(51) Int. Cl.
| | |
|---|---|
| H04W 52/02 | (2009.01) |
| H04W 88/06 | (2009.01) |
| G06F 1/16 | (2006.01) |
| H04M 1/02 | (2006.01) |
| H05K 5/02 | (2006.01) |

(52) U.S. Cl.
CPC ....... *H04W 88/06* (2013.01); *H04W 52/0251* (2013.01); *G06F 1/163* (2013.01)

(58) Field of Classification Search
CPC ... H04W 88/06; H04W 52/0251; G06F 1/163; G06F 1/1684; G06F 1/1686; G06F 2200/1633; G06F 1/1626; G06F 1/1656; H04M 2250/12; H04M 1/026; H05K 5/0217

USPC .......................................... 455/572; 370/329
See application file for complete search history.

(56) References Cited

U.S. PATENT DOCUMENTS

| | | | | |
|---|---|---|---|---|
| 9,300,347 | B1 * | 3/2016 | Coverstone | H04B 1/3888 |
| 10,132,967 | B2 * | 11/2018 | Nakagawa | C08J 7/0423 |
| 2005/0156813 | A1 * | 7/2005 | Adachi | H04N 13/395 |
| | | | | 345/1.3 |
| 2013/0310656 | A1 * | 11/2013 | Lim | A61B 5/0082 |
| | | | | 600/301 |
| 2015/0331275 | A1 * | 11/2015 | Yu | G02F 1/133308 |
| | | | | 349/58 |

(Continued)

FOREIGN PATENT DOCUMENTS

| | | | | |
|---|---|---|---|---|
| CN | 206389421 | U | 8/2017 | |
| CN | 108462767 | * | 8/2018 | .............. H04M 1/02 |

(Continued)

OTHER PUBLICATIONS

Ouyang Minghua, CN-108462767-A Translation, Aug. 2018 (Year: 2018).*

(Continued)

*Primary Examiner* — Inder P Mehra
(74) *Attorney, Agent, or Firm* — Syncoda LLC; Feng Ma

(57) ABSTRACT

An outer frame of a terminal, and belongs to terminal technologies includes a light-transmitting structure; and a light-transmitting member disposed corresponding to the light-transmitting structure; wherein the light-transmitting member absorbs or reflects light such that a luminous flux of light passing through the light-transmitting member is less than that of an incident light.

15 Claims, 6 Drawing Sheets

(56) References Cited

U.S. PATENT DOCUMENTS

| | | | | |
|---|---|---|---|---|
| 2016/0077401 | A1* | 3/2016 | Lamberger | G02B 5/0808 |
| | | | | 359/263 |
| 2019/0051711 | A1* | 2/2019 | Lee | H01L 27/3272 |
| 2019/0324593 | A1* | 10/2019 | Chung | G06F 1/1686 |
| 2020/0028950 | A1* | 1/2020 | Mody | H04M 1/0283 |
| 2020/0200596 | A1* | 6/2020 | Shepelev | G06F 3/03 |
| 2020/0218005 | A1* | 7/2020 | Ahn | G02B 6/0055 |
| 2020/0249489 | A1* | 8/2020 | Yen | G06F 1/1637 |
| 2020/0257124 | A1* | 8/2020 | Shin | G03H 1/02 |

FOREIGN PATENT DOCUMENTS

| | | | | | |
|---|---|---|---|---|---|
| CN | 108462767 | A | * | 8/2018 | H04M 1/026 |
| CN | 108462767 | A | | 8/2018 | |
| CN | 108494899 | | * | 9/2018 | H04M 1/02 |
| CN | 108494899 | A | * | 9/2018 | |
| CN | 108494899 | A | | 9/2018 | |
| CN | 108596080 | A | | 9/2018 | |
| EP | 3306383 | A1 | | 4/2018 | |

OTHER PUBLICATIONS

Zhang Xiang, CN-108494899-A Translation, Sep. 2018 (Year: 2018).*
Extended European Search Report in EP Application No. 19215333.6, dated May 26, 2020.
CN First Office Action in Application No. 201910100711.9, dated Nov. 25, 2020.

* cited by examiner

OUTER FRAME, TERMINAL HOUSING AND TERMINAL

CROSS-REFERENCE TO RELATED APPLICATION

The present application claims priority to Chinese Patent Application No. 201910100711.9 filed on Jan. 31, 2019, the disclosure of which is hereby incorporated by reference in its entirety.

BACKGROUND

A terminal is provided with a variety of functional modules to realize various functions. Generally, the functional modules are disposed on the front side of the terminal. Specifically, an operating surface of the functional modules for receiving or transmitting signals is located on a display side of the terminal.

It should be noted that, information disclosed in the above background portion is provided only for better understanding of the background of the present disclosure, and thus it may contain information that does not form the prior art known by those ordinary skilled in the art.

SUMMARY

The present disclosure relates to electronic device technologies, and more particularly, to an outer frame, a terminal housing and a terminal.

According to a first aspect of the present disclosure, there is provided an outer frame, comprising:

a light-transmitting structure; and a light-transmitting member disposed corresponding to the light-transmitting structure;

wherein the light-transmitting member absorbs or reflects light such that a luminous flux of light passing through the light-transmitting member is less than that of incident light.

In some embodiments, the light-transmitting member has a higher absorptivity or reflectivity of the incident light than its light transmittance of the incident light.

In some embodiments, the outer frame comprises: a transparent substrate and a light-transmitting and shielding layer disposed on the transparent substrate, wherein the light-transmitting and shielding layer absorbs or reflects light.

In some embodiments, the light-transmitting and shielding layer is coated on a surface of the transparent substrate, or is sandwiched between two transparent substrates.

In some embodiments, the light-transmitting structure comprises at least one of:

an open pore structure in the outer frame;

a structure having a light-transmitting slit in the outer frame;

a structure made of a light-transmitting material in the outer frame.

In some embodiments, the light-transmitting member blocks the open pore structure or the structure having the light-transmitting slit in the outer frame, and the light-transmitting member is aligned with the open pore structure or a region around the light-transmitting slit.

In some embodiments, the light-transmitting member comprises a two-way mirror.

According to a second aspect of the present disclosure, there is provided a terminal housing, comprising: at least one of side edges, a rear cover and a front cover; wherein the side edges and the rear cover are enclosed to form a cavity; and the terminal housing further comprises the outer frame according to the first aspect.

In some embodiments, the terminal housing further comprises: a support member which is connected to the outer frame, and is not light transmissive.

In some embodiments, the support member comprises an abutment surface recessed toward outside of the terminal housing; and the outer frame comprises a laterally extending abutting surface which abuts against the abutment surface.

According to a third aspect of the present disclosure, there is provided a terminal, comprising: a photosensor and the outer frame according to the first aspect or the terminal housing according to the second aspect;

wherein a photosensitive surface of the photosensor is disposed corresponding to the light-transmitting member.

In some embodiments, the outer frame comprises a screen frame in which a light-transmitting structure is formed, the light-transmitting member being disposed corresponding to the light-transmitting structure; and the terminal further comprises a photosensor disposed corresponding to the light-transmitting member in the screen frame.

In some embodiments, the photosensor is selected from at least one of a structured light module, an optical fingerprint recognition module, an optical distance monitoring module and a camera module.

It is to be understood that both the foregoing general description and the following detailed description are exemplary and explanatory only and are not restrictive of the present disclosure.

This section provides a summary of various implementations or examples of the technology described in the disclosure, and is not a comprehensive disclosure of the full scope or all features of the disclosed technology.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

The inventors have recognized that it is difficult to allow a functional module having a photosensor to be disposed corresponding to an outer frame in the relevant technologies. Specifically, since the photosensor operates based on an optical signal, when the functional module having the photosensor is disposed corresponding to the outer frame, a light-transmitting hole needs to be formed on the outer frame, which corresponds to a photosensitive surface of the photosensor.

However, the terminal usually has a thin thickness, so its outer frame has a small height. In this case, the opening of the light-transmitting hole in the outer frame easily affects the mechanical stability of the outer frame and there may not be enough space for the forming a hole, which all increase the difficulty in providing the functional module having the photosensor on the side edge of the terminal.

Various embodiments of the present disclosure can address the above problem, and provide an outer frame, a terminal housing and a terminal. The terminal can be a mobile phone, a tablet computer or a wearable device. Descriptions will be made by taking side edges and mobile phones for example in the following drawings.

Figure 1:
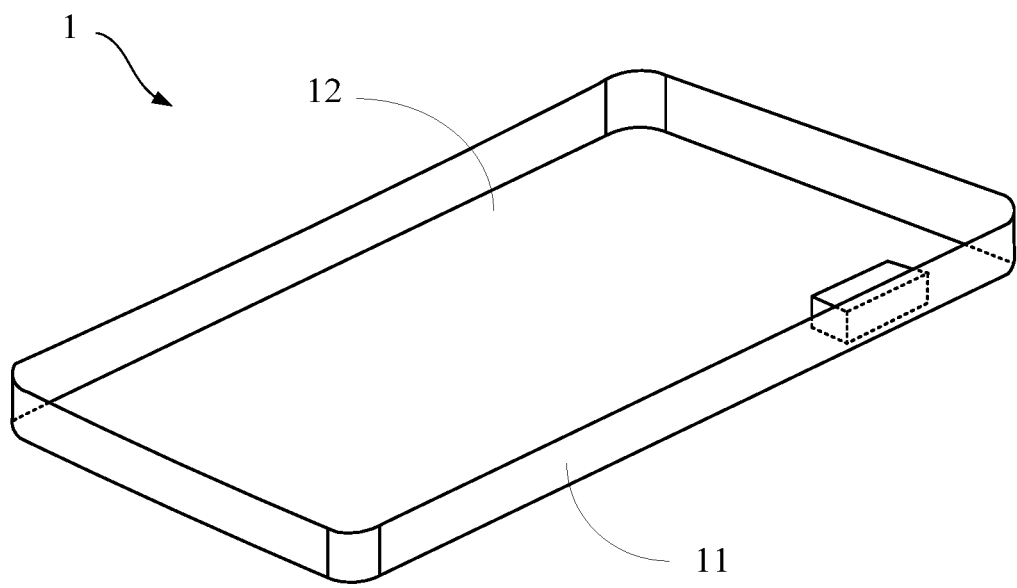
FIG. 1 is a structural schematic diagram illustrating an outer frame according to some embodiments.

According to a first aspect, an embodiment of the present disclosure provides an outer frame 1. As shown in FIG. 1, the outer frame 1 includes a light-transmitting structure, which is a structure that allows light to pass therethrough. Moreover, the outer frame 1 further includes a light-transmitting member 11 disposed corresponding to the light-transmitting structure. Obviously, a portion of the outer frame 1 that corresponds to the light-transmitting structure and the light-transmitting member 11 allows light to pass therethrough. Therefore, when in use, a photosensitive surface of a photosensor is optionally disposed corresponding to the light-transmitting member 11 and the normal use of the photosensor is ensured with light passing through the light-transmitting member 11.

In some embodiments, the outer frame 1 includes all the sides of a terminal, which encircles to from a mounting area 12 (as shown in FIG. 1) in which a display screen is mounted. Alternatively, the outer frame 1 includes part of the sides of a terminal.

In some embodiments, the light-transmitting structure 11 can be implemented by at least one of the following ways.

As an example, the light-transmitting structure 11 is an open pore structure in the outer frame 1.

As an example, the light-transmitting structure 11 is a structure having a light-transmitting slit in the outer frame 1, for example, a light-transmitting slit formed at a junction of various components in the outer frame 1.

In the above two examples, the light-transmitting member 11 blocks the open pore structure or the light-transmitting slit in the outer frame 1, so that the outer frame 1 becomes an integral structure. Moreover, the light-transmitting member 11 is aligned with an area around the open pore structure or the light-transmitting slit. Thus, the outer frame 1 will have a continuous structure and its integration effect will be optimized.

Specifically, the light-transmitting member 11 will have a planar structure if the open pore structure or the light-transmitting slit of the outer frame 1 is a planar structure; and the light-transmitting member 11 will have a curved surface structure if the open pore structure or the light-transmitting slit of the outer frame 1 is a curved surface structure.

In addition, in the two examples, the outer frame 1 optionally does not include a light-transmitting material, for example, the outer frame 1 is a metal outer frame, a ceramic outer frame, or the like.

As an example, the light-transmitting structure is a structure made of a light-transmitting material in the outer frame 1. For example, the middle frame 1 is a transparent middle frame. Alternatively, the outer frame 1 includes a transparent portion. For example, the outer frame 1 includes a transparent substrate and an opaque film plated on the transparent substrate and a region on the transparent substrate of the outer frame 1 where no opaque film is provided becomes a light-transmitting region.

It can be understood that a light-transmitting member 11 disposed in the light-transmitting region of the outer frame 1 can allow light to pass therethrough. Therefore, even if the photosensor is placed under the light-transmitting member 11, the light passing through the light-transmitting member 11 allows the photosensor to operate.

In other words, given an integral structure, the outer frame 1 meets the needs of the photosensor assembled therewith. Therefore, the structural stability of the outer frame 1 is optimized and its manufacturing processes are simplified.

Further, the light-transmitting member 11 also has the capability of absorbing or reflecting light. Further, the light-transmitting member 11 absorbs or scatters light, so that a luminous flux of light passing through the light-transmitting member 11 is less than that of the incident light in the same direction. Thus, the light-transmitting member 11 can shield the structure under the light-transmitting member 11, and has shielding performance of the outer frame 1.

In some embodiments, the light-transmitting member 11 has a higher absorptivity or reflectivity of the incident light than its light transmittance of the incident light. Accordingly, the shielding property of the light-transmitting member 11 is further enhanced and the terminal's appearance is optimized which meets user requirements.

For example, when the light-transmitting member 11 absorbs the incident light, among light incident on a side of the light-transmitting member 11, an intensity of light passing through the light-transmitting member 11 is less than that of light absorbed by the light-transmitting member 11. It can be understood that when brightness of ambient light on one side of the light-transmitting member 11 is high while brightness of ambient light on the other side is low, it is difficult to see the other side of the light-transmitting member 11 from the one side with higher brightness of ambient light of the light-transmitting member 11. Namely, the shielding property of the light-transmitting member 11 is achieved.

In this case, the light-transmitting member 11 can be a heat insulating film.

Figure 2:
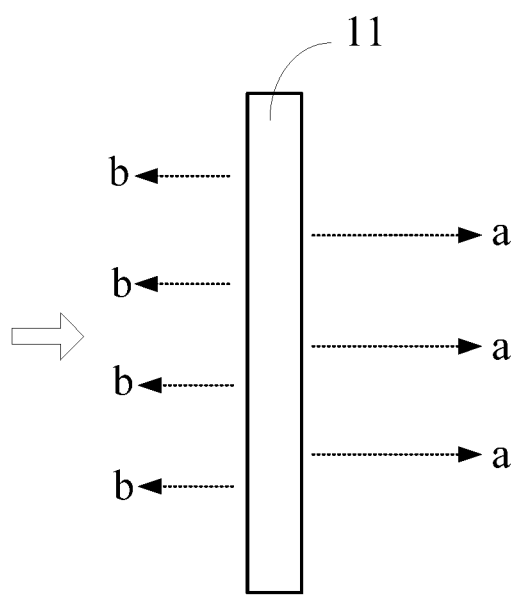
FIG. 2 is a schematic diagram illustrating the principle of a light-transmitting member in an outer frame according to some embodiments.

For example, with regard to the reflecting of the incident light by the light-transmitting member 11, referring to FIG. 2, light is incident on one side of the light-transmitting member 11, in which first light a passes through the light-transmitting member 11 and second light b is reflected by the light-transmitting member 11. Since a reflective index of the light-transmitting member 11 is greater than its light pass-through rate, the second light b has a greater intensity than that of the first light a. It can be understood that when brightness of ambient light on one side of the light-transmitting member 11 is high while brightness of ambient light on the other side is low, it is difficult to see the other side of the light-transmitting member 11 from the one side with higher brightness of ambient light of the light-transmitting member 11. Namely, the shielding property of the light-transmitting member 11 is achieved.

The light-transmitting member 11 can represent a mirror image on the side with higher brightness of ambient light by the reflected second light b. For example, when a screen frame is applied to a terminal device, the outer frame 1 represents a mirror image of an external environment of the terminal with the second light b reflected by the light-transmitting member 11, which further improves user experience brought by the screen frame.

In addition, in this case, the light-transmitting member 11 can be a two-way mirror. In some embodiments, the light-transmitting member 11 can be a peeping mirror. An intensity of ambient light inside the terminal is weak, so that the outer frame 1 can have the properties of light-transmitting and shielding and also maintain an integral structure at the same time.

It should be noted that the outer frame 1 is generally applied to the terminal and its one side faces the inside of the terminal. Obviously, an intensity of ambient light inside the terminal is weaker than that of a space outside the terminal, in which the terminal is used. Therefore, in this case, the outer frame 1 provided by the present disclosure achieves both the properties of light-transmitting and shielding by the light-transmitting member 11.

As such, in some embodiments of the present disclosure, it can be guaranteed that the outer frame 1 provided by the embodiment of the present disclosure is characterized by a complete and continuous structure via the light-transmitting member 11, which helps to reduce the number of open pores on the outer frame 1 or leads to a situation in which no light-transmitting hole is opened. Therefore, the structural stability of the outer frame 1 is optimized and manufacturing processes of the outer frame 1 are simplified.

In some embodiments, the outer frame has a seamless structure without an open pore, thereby allowing the terminal such as the mobile phone to have a seamless structure not only visually more pleasing but also can be more water resistant.

Furthermore, it should be noted that in an embodiment of the present disclosure, a specific characterization amount of light intensity is not limited, such as illuminance, power, and the like.

Figure 3:
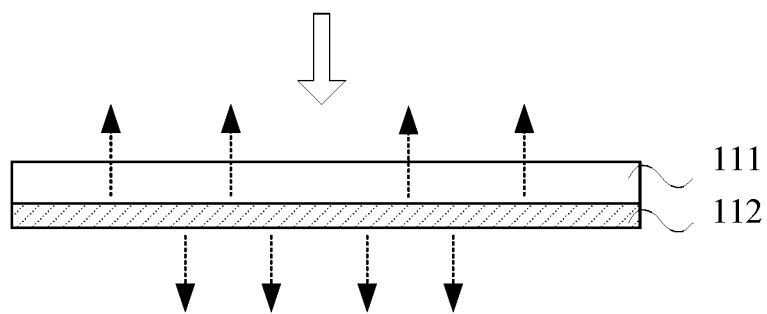
FIG. 3 is a first structural schematic diagram illustrating an outer frame according to some embodiments.
Figure 4:
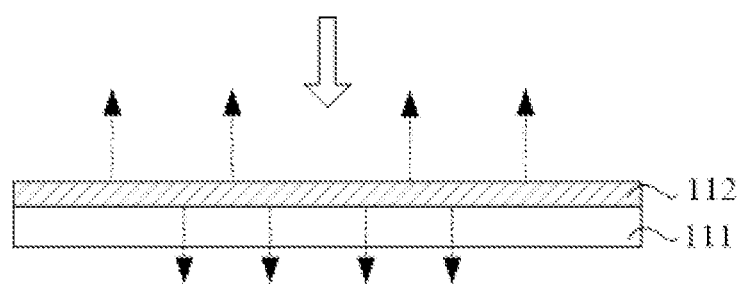
FIG. 4 is a second structural schematic diagrams illustrating an outer frame according to some embodiments.
Figure 5:
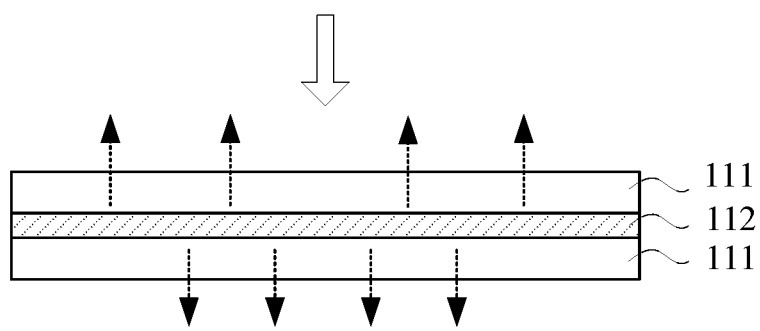
FIG. 5 is a third structural schematic diagrams illustrating an outer frame according to some embodiments.

FIGS. 3-5 are cross-sectional views illustrating an outer frame according to various exemplary embodiments.

In an embodiment, a light-transmitting member 11 includes a transparent substrate 111 and a light-transmitting and shielding layer 112 disposed on the transparent substrate 111. The light-transmitting and shielding layer 112 allows first light a to pass through but reflects second light b. The transparent substrate 111 and the light-transmitting and shielding layer 112 can be disposed in optional ways as follows.

As shown in FIG. 3, the first way is to coat and dispose the light-transmitting and shielding layer 112 on one side of the transparent substrate 111. In some embodiments, the light-transmitting and shielding layer 112 is disposed on a surface of the transparent substrate 111 away from a photosensor. Accordingly, the light-transmitting and shielding layer 112 is directly exposed outside and the second light b is reflected without passing through the transparent substrate 111.

As shown in FIG. 4, the second way is to coat and dispose the light-transmitting and shielding layer 112 on a surface of the transparent substrate 111 facing the photosensor. Accordingly, the second light b reflected by the light-transmitting and shielding layer 112 passes through the transparent substrate 111 and exits out of the light-transmitting member 11.

In this case, the transparent substrate 111 is optionally a transparent substrate having a predetermined color. Further, by the reflection of the light-transmitting and shielding layer 112, the light-transmitting member 11 displays a predetermined color, so the display effect of the light-transmitting member 11 will be enriched.

Moreover, when the light-transmitting member 11 is used in a terminal, the transparent substrate 111 faces outside of the terminal and the light-transmitting and shielding layer 112 is located inside the terminal, so that the light-transmitting and shielding layer 112 is immune to interference via the transparent substrate 111.

As shown in FIG. 5, the third way is to form the light-transmitting and shielding layer 112 inside the transparent substrate 111. In some embodiments, a light-transmitting frame 11 includes two opposite transparent substrates 111, between which the light-transmitting and shielding layer 112 is disposed. By the transparent substrates 111, it is ensured that the light-transmitting and shielding layer 112 is immune to interference no matter inside or outside the terminal, and is stably disposed in the transparent substrates 111.

In some embodiments, the transparent substrate 111 on a side of the light-transmitting and shielding layer 112 away from the photosensor is a colored transparent body having a predetermined color, so that the light-transmitting member 11 can display a predetermined color.

In the embodiments, the transparent substrates 111 can be a glass substrate, a resin substrate or the like. The light-transmitting and shielding layer 112 can be a resin film layer, a paint layer or a metal layer. In some embodiments, the light-transmitting and shielding layer 112 is formed on the transparent substrate 111 by plating, spraying or injection molding. In particular, when the transparent substrates 111 and the light-transmitting and shielding layer 112 are made of a resin material, the light-transmitting member 11 can be integrated and manufactured by double injection molding.

In some other embodiments, the light-transmitting member 11 can have a single layer structure, for example, it is a translucent resin plate having a predetermined color.

Figure 6:
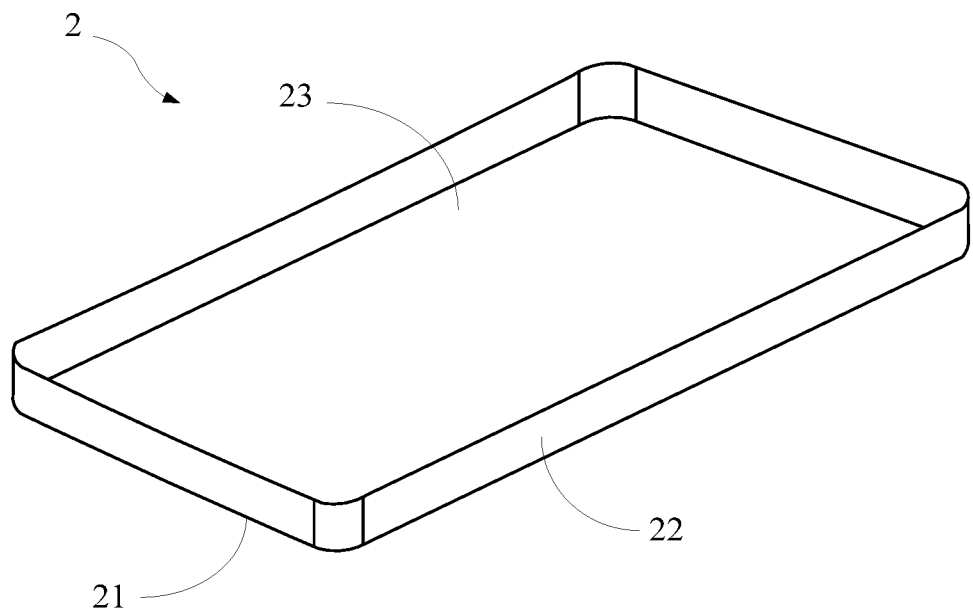
FIG. 6 is a first cross-sectional view illustrating an outer frame according to some embodiments.
Figure 7:
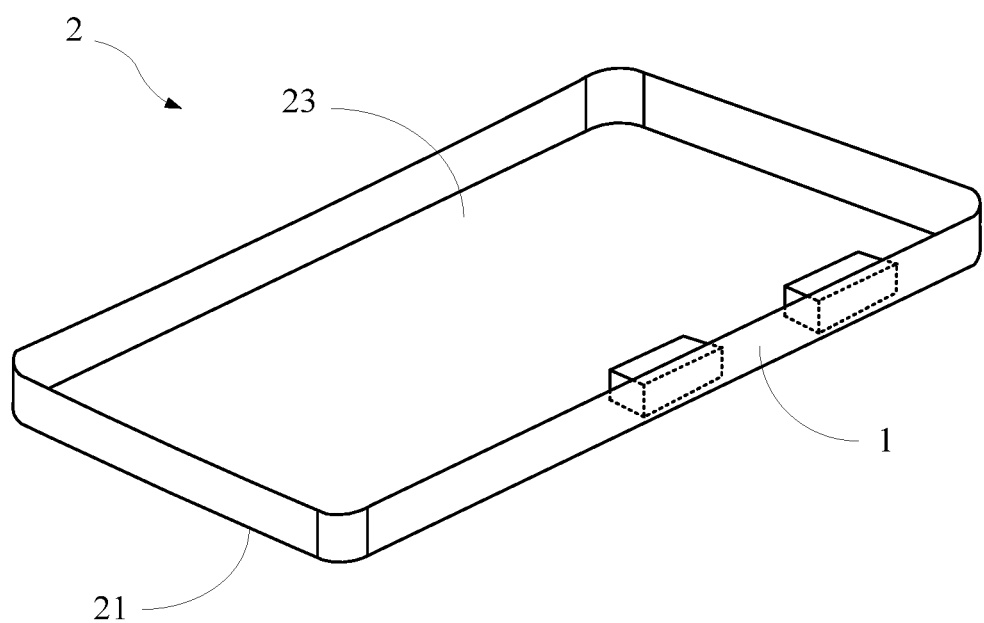
FIG. 7 is a second cross-sectional views illustrating an outer frame according to some embodiments.

In a second aspect, various embodiments of the present disclosure provide a terminal housing 2. As shown in FIGS. 6 and 7, the terminal housing includes at least one of a rear cover 21, a side edge 22 and a front cover (not shown, it is a component of a terminal located on one side of a display surface, such as a cover plate or a screen frame). The side edge 22 and the rear cover 21 are encircled to form a cavity 23.

In some embodiments, the rear cover 21 and the side edge 22 are integrally formed. Alternatively, an outer frame 1 and the rear cover 21 are two detachable components. Accordingly, a material of the rear cover 21 is not limited, for example, the rear cover 21 is a ceramic rear cover or a metal rear cover.

Moreover, the terminal housing 2 further includes the outer frame 1 according to the first aspect described above. In some embodiments, at least one of the rear cover 21, the side edge 22 and the front cover includes the outer frame 1. For example, as shown in FIG. 7, the side edge 22 includes the outer frame 1.

Figure 8:
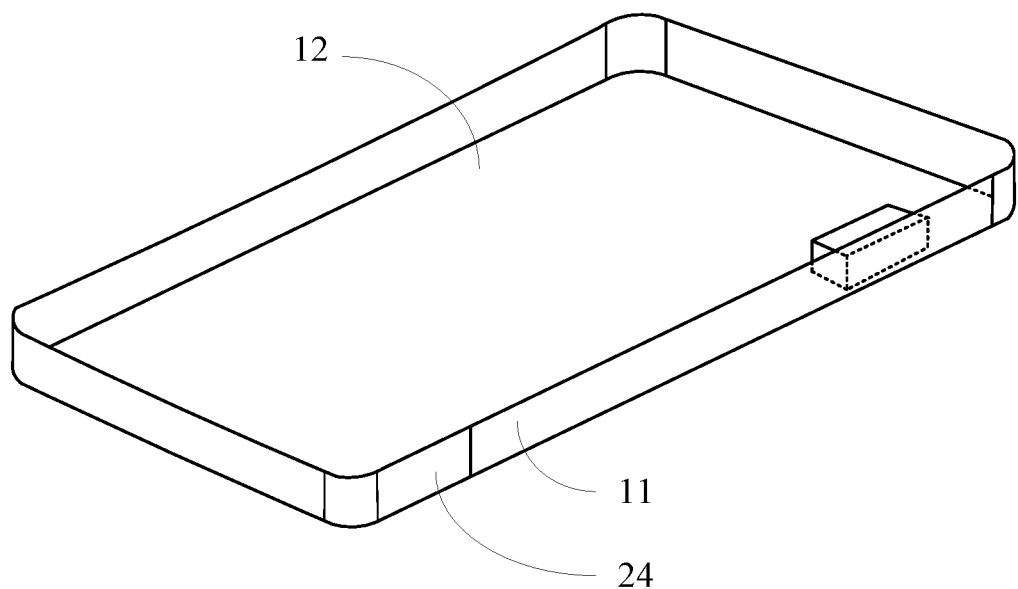
FIG. 8 is a third cross-sectional views illustrating an outer frame according to some embodiments.
Figure 9:
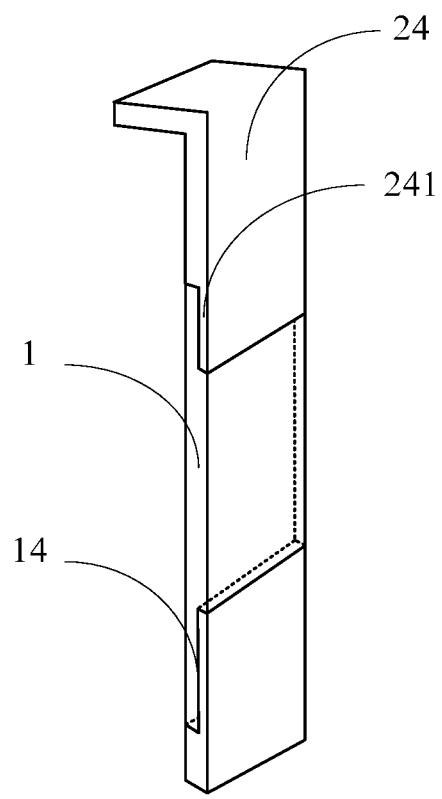
FIG. 9 is a structural schematic diagram illustrating a terminal housing according to some embodiments.

In the embodiment, the terminal housing has various types of structures. In some embodiments, the outer frame 1 is integrally formed on the terminal housing 2. Alternatively, as shown in FIGS. 8 and 9, the light-transmitting member 11 is part of the outer frame 1. For example, as shown in FIG. 8, the terminal 2 further includes a support member 24 which is connected to the outer frame 1 and is not light-transmissive.

The opaque support member 24 achieves a high shielding effect, so that a portion of the terminal in which no photosensor is disposed is completely shielded. Moreover, a vision difference between the support member 24 and the light-transmitting member 11 of the outer frame 1 allows a user to know a position of a functional module having a photosensor, so the ease of use of the terminal is increased and user experience is improved.

The various device components, circuits, modules, units, blocks, or portions may have modular configurations, or are composed of discrete components, but nonetheless may be referred to as "modules" or "portions" in general. In other words, the "components," "circuits," "modules," "units," "blocks," or "portions" referred to herein may or may not be in modular forms.

The support member 24 and the outer frame 11 can be optionally connected in the way as shown in FIG. 9. Specifically, the support member 24 includes an abutment surface 241 that is recessed toward outside of the outer frame 1. The outer frame 1 includes a laterally extending abutment surface 14. When assembled, the abutment surface 14 of the outer frame 1 abuts against the abutment surface 241 of the support member 24. The joint of the abutment surface 241 and the abutment surface 14 increases a connection area of the outer frame 1 and the support member 24, so as to improve the connection stability of the outer frame 1 and the support member 24.

Alternatively, the light-transmitting member 11 is one of side edges of the outer frame 1, or is part of one of the side edges of the outer frame 1. In some embodiments, the support member 24 is selected from any part of the terminal housing that is connected to the outer frame 1.

Figure 10:
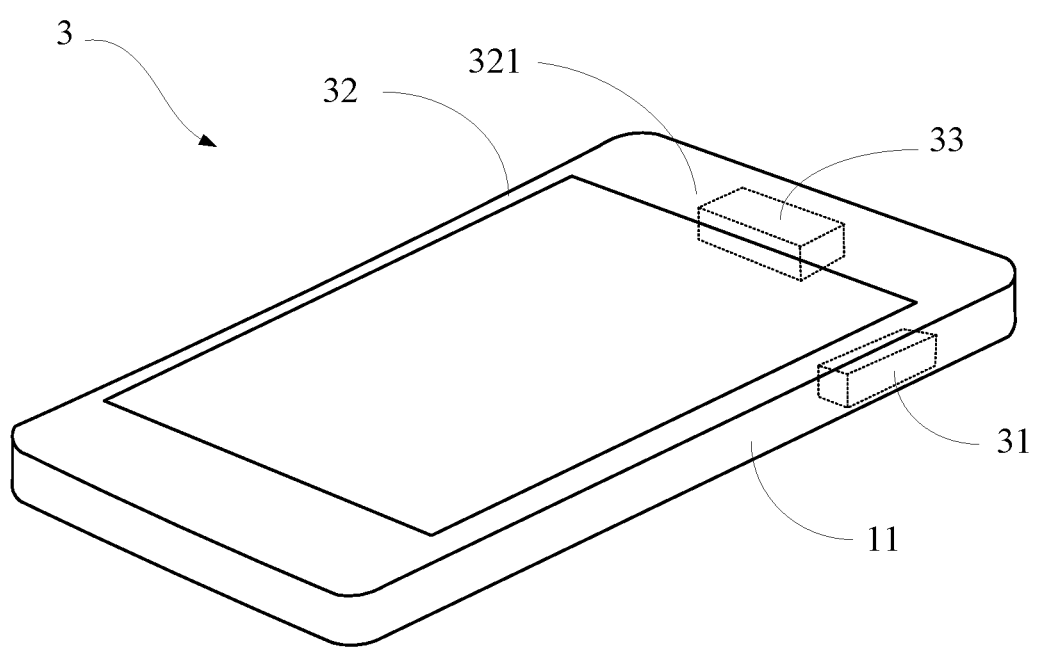
FIG. 10 is a schematic structural diagram illustrating a terminal according to some embodiments.

According to a third aspect, an embodiment of the present disclosure provides a terminal 3. FIG. 10 is a structural schematic diagram illustrating a terminal according to some embodiments.

As shown in FIG. 10, the terminal 3 includes a photosensor 31 and the terminal housing 2 according to the second aspect described above. A photosensitive surface of the photosensor 31 is disposed corresponding to the light-transmitting member 11 of the outer frame 1 in the terminal housing 2.

The number of the photosensors 31 is not limited, but photosensitive surfaces of the photosensors 31 are all disposed corresponding to the light-transmitting member 11.

In some embodiments of the present disclosure, a plurality of photosensors 31 can be disposed on the side edges of the terminal by assembling the photosensors 31 and the light-transmitting member 11 in the outer frame 1 to achieve various functions. Moreover, in this case, it is not necessary to provide a plurality of light-transmitting holes, so the structure stability of the outer frame 1 is ensured and functions of the side edges of the terminal 3 are realized. Detailed descriptions will be made hereinafter in conjunction with specific examples.

For example, the photosensor 31 is a sensor in a distance monitoring module. A distance from a target object outside the terminal to the side edge can be monitored by the photosensor 31.

For example, the photosensor 31 is a sensor in a fingerprint recognition module. A fingerprint feature of a target object at the side edge of the terminal can be identified by the photosensor 31, so as to trigger designated functions such as unlocking, paying or photographing.

It can be understood that in the embodiment, the light-transmitting member 11 covers the photosensors 31 to meet the normal use of the sensors 31.

In some embodiments, the terminal 3 further includes a screen frame 32 which includes the light-transmitting member 11 according to the first aspect described above. Therefore, the terminal 3 optionally further includes a photosensor 33 disposed corresponding to a light-transmitting member 11. Similarly, the light-transmitting member 11 can maintain the structural integrity of the screen frame 32 when it ensures the normal use of the photosensor 33 and the shielding of the photosensor 33. Accordingly, it contributes to reducing open pores on the screen frame 32, improving the structural stability of the screen frame 32 and simplifying production processes of the screen frame 32.

In addition, it should be noted that in the terminal provided by the embodiment of the present disclosure, the photosensor (31, 33) can be selected from sensors of any of the following functional modules: a structured light module, an optical fingerprint recognition module, an optical distance monitoring module and a camera module.

Figure 11:
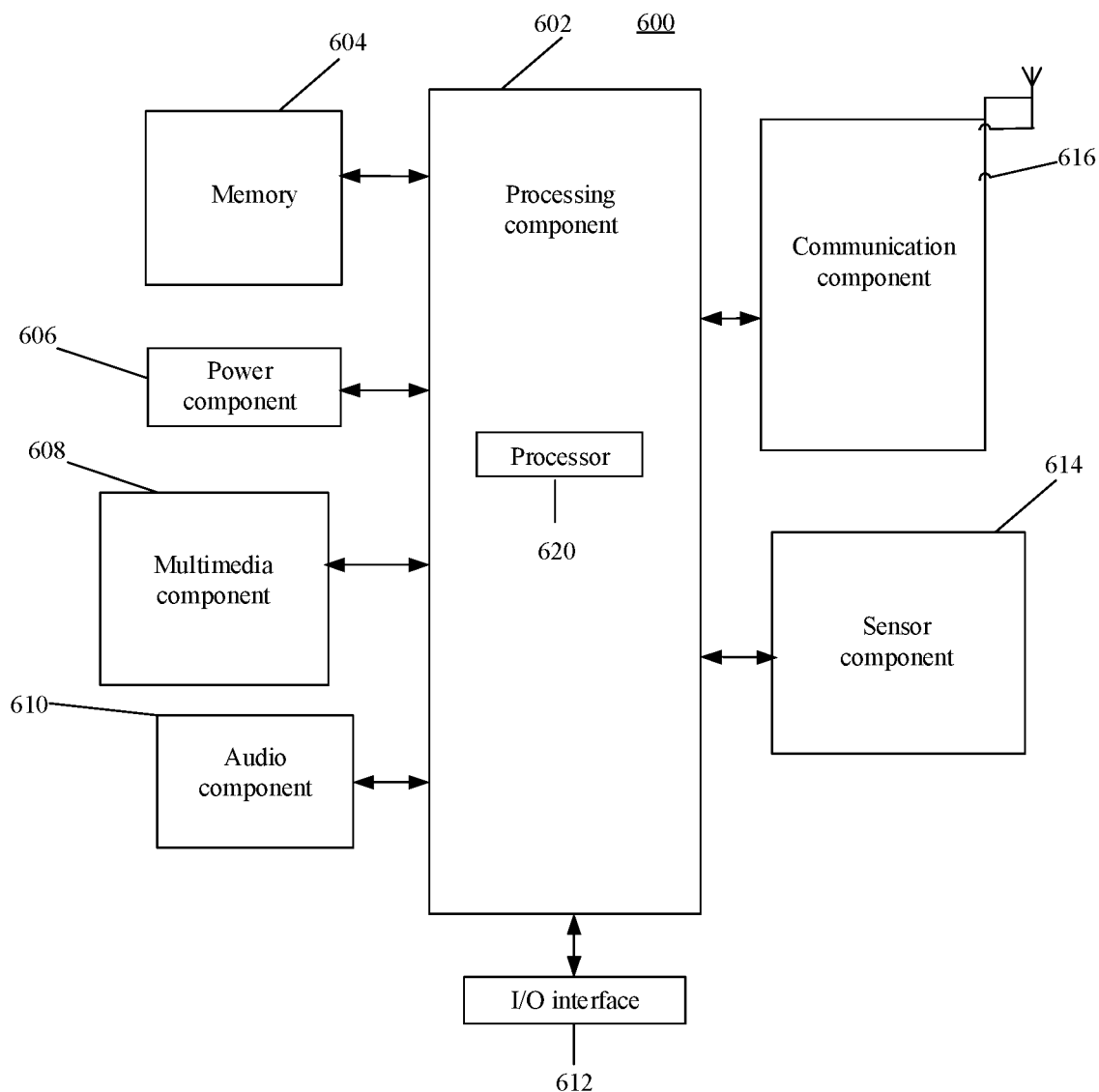
FIG. 11 is a block diagram of a terminal according to some embodiments of the present disclosure.

FIG. 11 is a block diagram of a terminal 600 according to some embodiments of the present disclosure. For example, the terminal 600 may be a mobile phone, a computer, a digital broadcast terminal, a messaging device, a gaming console, a tablet, a medical device, exercise equipment, a personal digital assistant and the like.

Referring to FIG. 6, the terminal 600 may include one or more of the following components: a processing component 602, a memory 604, a power component 606, a multimedia component 608, an audio component 610, an Input/Output (I/O) interface 612, a sensor component 614, and a communication component 616.

The processing component 602 typically is configured to control overall operations of the terminal 600, such as the operations associated with display, telephone calls, data communications, camera operations, and recording operations. The processing component 602 may include one or more processors 620 to execute instructions to perform all or part of the operations in the abovementioned method. Moreover, the processing component 602 may include one or more portions which facilitate interaction between the processing component 602 and the other components. For instance, the processing component 602 may include a multimedia portion to facilitate interaction between the multimedia component 608 and the processing component 602.

The memory 604 is configured to store various types of data to support the operation of the device 600. Examples of such data include instructions for any application programs or methods operated on the terminal 600, contact data, phonebook data, messages, pictures, video, etc. The memory 604 may be implemented by any type of volatile or non-volatile memory devices, or a combination thereof, such as an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, and a magnetic or optical disk.

The power component 606 is configured to provide power for various components of the terminal 600. The power component 606 may include a power management system, one or more power supplies, and other components associated with generation, management and distribution of power for the terminal 600.

The multimedia component 608 may include a screen providing an output interface between the terminal 600 and a user. In some embodiments, the screen may include an LCD and a Touch Panel (TP). In some embodiments, organic light-emitting diode (OLED) or other types of displays can be employed.

If the screen includes the TP, the screen may be implemented as a touch screen to receive an input signal from the user. The TP may include one or more touch sensors to sense touches, swipes and gestures on the TP. The touch sensors may not only sense a boundary of a touch or swipe action but also detect a duration and pressure associated with the touch or swipe action. In some embodiments, the multimedia component 608 may include a front camera and/or a rear camera. The front camera and/or the rear camera may receive external multimedia data when the device 600 is in an operation mode, such as a photographing mode or a video mode. Each of the front camera and the rear camera may be a fixed optical lens system or have focusing and optical zooming capabilities.

The audio component 610 is configured to output and/or input an audio signal. For example, the audio component 610 may include a Microphone (MIC), and the MIC is configured to receive an external audio signal when the terminal 600 is in the operation mode, such as a call mode, a recording mode and a voice recognition mode. The received audio signal may further be stored in the memory 604 or sent through the communication component 616. In some embodiments, the audio component 610 further may include a speaker configured to output the audio signal.

The I/O interface 612 is configured to provide an interface between the processing component 602 and a peripheral interface module, and the peripheral interface module may be a keyboard, a click wheel, a button and the like. The button may include, but not limited to: a home button, a volume button, a starting button and a locking button.

The sensor component 614 may include one or more sensors configured to provide status assessment in various aspects for the terminal 600. For instance, the sensor component 614 may detect an on/off status of the device 600 and relative positioning of components, such as a display and small keyboard of the terminal 600, and the sensor component 614 may further detect a change in a position of the terminal 600 or a component of the terminal 600, presence or absence of contact between the user and the terminal 600, orientation or acceleration/deceleration of the terminal 600 and a change in temperature of the terminal 600. The sensor component 614 may include a proximity sensor configured to detect presence of an object nearby without any physical contact. The sensor component 614 may also include a light sensor, such as a Complementary Metal Oxide Semiconductor (CMOS) or Charge Coupled Device (CCD) image sensor, configured for use in an imaging APP. In some embodiments, the sensor component 614 may also include an acceleration sensor, a gyroscope sensor, a magnetic sensor, a pressure sensor or a temperature sensor.

The communication component 616 is configured to facilitate wired or wireless communication between the terminal 600 and other equipment. The terminal 600 may access a communication-standard-based wireless network, such as a Wireless Fidelity (Wi-Fi) network, a $2^{nd}$-Generation (2G), $3^{rd}$-Generation (3G), $4^{th}$-Generation (4G), or $5^{th}$-Generation (5G) network or a combination thereof.

Various embodiments of the present disclosure can have one or more of the following advantages.

The outer frame provided by the embodiments of the present disclosure allows light to pass through its light-transmitting member. Therefore, when the outer frame and the photosensor are assembled, the light that passes through the light-transmitting member is received by the photosensor to keep the photosensor working. Moreover, the light-transmitting member plays a role in shielding by absorbing or reflecting light, so the shielding effect of the outer frame is realized. The outer frame provided by the embodiments of the present disclosure reduces open pores on the outer frame because of the light-transmitting member, which not only improves the structure stability of the outer frame but also simplifies its manufacturing processes.

In the present disclosure, the terms "installed," "connected," "coupled," "fixed" and the like shall be understood broadly, and can be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

In the description of the present disclosure, the terms "one embodiment," "some embodiments," "example," "specific example," or "some examples," and the like can indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

It should be understood that "a plurality" or "multiple" as referred to herein means two or more. "And/or," describing the association relationship of the associated objects, indicates that there may be three relationships, for example, A and/or B may indicate that there are three cases where A exists separately, A and B exist at the same time, and B exists separately. The character "/" generally indicates that the contextual objects are in an "or" relationship.

In the present disclosure, it is to be understood that the terms "lower," "upper," "under" or "beneath" or "underneath," "above," "front," "back," "left," "right," "top," "bottom," "inner," "outer," "horizontal," "vertical," and other orientation or positional relationships are based on example orientations illustrated in the drawings, and are merely for the convenience of the description of some embodiments, rather than indicating or implying the device or component being constructed and operated in a particular orientation. Therefore, these terms are not to be construed as limiting the scope of the present disclosure.

Moreover, the terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly. In the description of the present disclosure, "a plurality" indicates two or more unless specifically defined otherwise.

In the present disclosure, a first element being "on" a second element may indicate direct contact between the first and second elements, without contact, or indirect geometrical relationship through one or more intermediate media or layers, unless otherwise explicitly stated and defined. Similarly, a first element being "under," "underneath" or "beneath" a second element may indicate direct contact between the first and second elements, without contact, or indirect geometrical relationship through one or more intermediate media or layers, unless otherwise explicitly stated and defined.

Some other embodiments of the present disclosure can be available to those skilled in the art upon consideration of the specification and practice of the various embodiments disclosed herein. The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims.

The invention claimed is:

1. A frame assembly for a terminal or terminal housing, comprising:
   at least one side edge;
   a light-transmitting structure formed in the side edge; and
   a light-transmitting member disposed corresponding to the light-transmitting structure;
   wherein the light-transmitting structure comprises at least one of:
      an open pore structure formed in the frame assembly; and
      a light-transmitting slit formed in the frame assembly, wherein the light-transmitting member is configured to block the open pore structure or the light-transmitting slit and aligned with the open pore structure or a region around the light-transmitting slit such that the light-transmitting structure and the frame assembly form an integral structure,
   wherein a reflecting rate of the light-transmitting member is greater than a light pass-through rate of the light-transmitting member, and the light-transmitting member is configured to face an inside of the terminal or the terminal housing that has a light intensity lower than that of an ambient light, and to shield incident light by absorption or reflection, wherein more of the incident light is absorbed or reflected by the light-transmitting member than that passes therethrough,
   wherein the light-transmitting member is a part of one of the at least one side edge of the frame assembly and configured as a light-transmitting hole of the frame assembly, so as to receive light needed to operate a photosensor, and
   wherein a photosensitive surface of the photosensor is disposed underneath the part of one of the at least one side edge of the frame assembly and facing the light-transmitting member, to facilitate the photosensor sensing the incident light passing through the light-transmitting member.

2. The frame assembly according to claim 1,
   wherein the light-transmitting member comprises a transparent substrate and a light-shielding layer disposed on the transparent substrate, wherein the light-shielding layer is configured to absorb or reflect light.

3. The frame assembly according to claim 2, wherein the light-shielding layer is coated on a surface of the transparent substrate.

4. The frame assembly according to claim 2, wherein the light-transmitting member comprises two opposing transparent substrates, and the light-shielding layer is sandwiched between the two opposing transparent substrates.

5. The frame assembly according to claim 1, wherein the light-transmitting structure comprises a light-transmitting material formed in a portion of the frame assembly.

6. The frame assembly according to claim 1, wherein the light-transmitting member comprises a two-way mirror.

7. A terminal housing for a mobile terminal, comprising the frame assembly according to claim 1; wherein the side edge forms a cavity for accommodating components of the mobile terminal.

8. The terminal housing according to claim 7, further comprising:
   a support member which is connected to the frame assembly, and is not light transmissive.

9. The terminal housing according to claim 7, wherein the support member comprises an abutment surface recessed toward outside of the terminal housing; and
   the frame assembly comprises a laterally extending abutting surface which abuts against the abutment surface.

10. A terminal, comprising: a photosensor and the terminal housing according to claim 7;
    wherein the photosensitive surface of the photosensor is aligned with the light-transmitting member.

11. The terminal according to claim 10, further comprising a screen frame in which an auxiliary light-transmitting structure and an auxiliary light-transmitting member corresponding to the auxiliary light-transmitting structure are formed; wherein the auxiliary light-transmitting member is configured to shield light by absorption or reflection, wherein more of the light is absorbed or reflected by the auxiliary light-transmitting member than that passes therethrough; and the terminal further comprises a second photosensor disposed corresponding to the auxiliary light-transmitting member.

12. The terminal according to claim 11, wherein the photosensor and the second photosensor comprise at least one of a structured light module, an optical fingerprint recognition module, an optical distance monitoring module, and a camera module.

13. The terminal according to claim 12, wherein the terminal is a mobile phone and further comprises a display screen.

14. The terminal according to claim 13, wherein the light-transmitting member comprises a mirror, and is configured to shield by absorbing or reflecting light, such that a shielding effect of the frame assembly is realized.

15. The terminal according to claim 14, wherein the frame assembly has a seamless structure without an open pore.

\* \* \* \* \*